No. 735,348. PATENTED AUG. 4, 1903.
H. DEININGER & H. ANDRÉ.
APPARATUS FOR EVAPORATING LIQUIDS.
APPLICATION FILED APR. 15, 1903.
NO MODEL.

WITNESSES:

INVENTORS

No. 735,348.

Patented August 4, 1903.

UNITED STATES PATENT OFFICE.

HEINRICH DEININGER, OF BERNAU, AND HERMANN ANDRÉ, OF BUCH, GERMANY.

APPARATUS FOR EVAPORATING LIQUIDS.

SPECIFICATION forming part of Letters Patent No. 735,348, dated August 4, 1903.

Application filed April 15, 1903. Serial No. 152,680. (No model.)

*To all whom it may concern:*

Be it known that we, HEINRICH DEININGER, chemist, of Breitestrasse 285, Bernau, and HERMANN ANDRÉ, engineer, of Buch, near Potsdam, in the Empire of Germany, have invented certain new and useful Improvements in Apparatus for Evaporating Liquids, of which the following is a specification.

This invention relates to a new or improved apparatus for the rapid and complete evaporation *in vacuo* of liquids of all kinds. For instance, of liquids liable to undergo changes—such as milk, fruit juices, and the like—and for the evaporation of sewage and sea-water, for distilling, and for all general purposes of evaporation. The apparatus is particularly well adapted for this purpose since the liquids are heated externally and internally while they flow through Pistorius pans of the known kind.

Proposals have already been made for accelerating the evaporation of liquids by causing them to trickle in thin layers over heated surfaces and the heating of the evaporators has been effected on the counter-current principle. For preliminary heating the utilization of steam developed from the liquid treated has also been contemplated.

It has now been ascertained that with suitable constructional modifications the known Pistorius pans used for spirit rectification are particularly well adapted for use for evaporating *in vacuo* liquids of all kinds.

Figure 1:
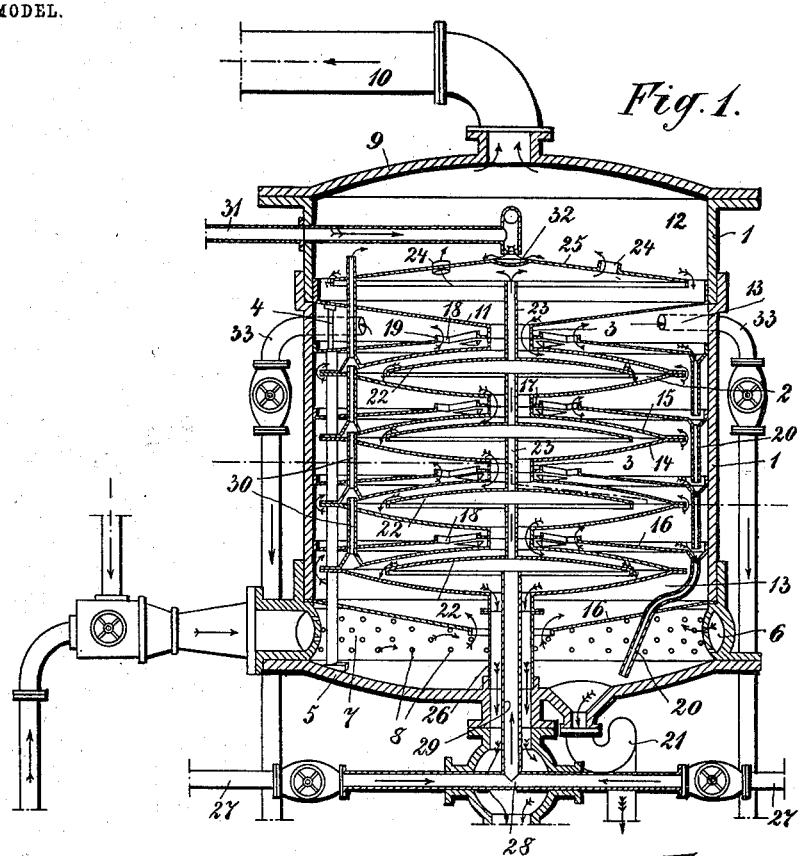
Figure 2:
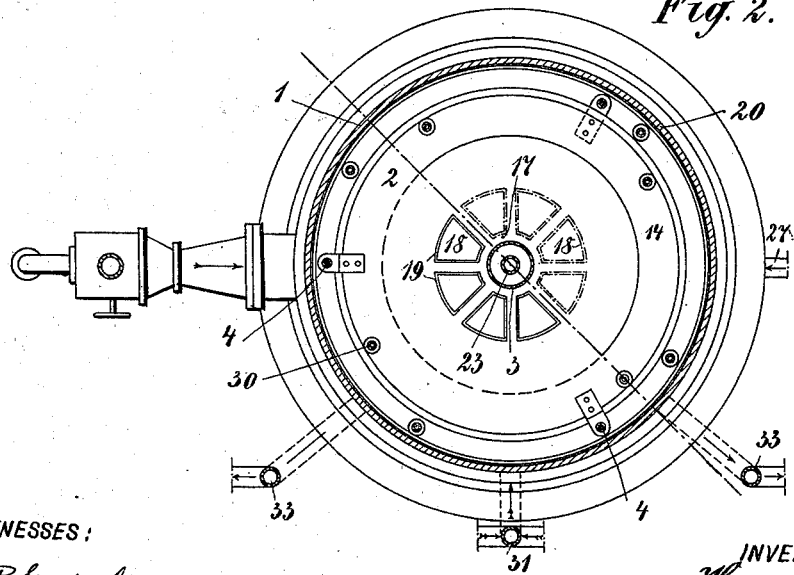

In the annexed drawings, Figure 1 is a vertical section of a modified apparatus of this kind, and Fig. 2 a horizontal section.

In the drawings the directions of flow of the various fluids are indicated as follows: ←—— steam developed from the liquid, ←——⟨ heating steam, ←——⟨⟨ liquid to be evaporated, ←——⟨⟨⟨ condensed steam, (water.)

The evaporator comprises a vessel, in the cylindrical part 1 of which the desired number of Pistorius pans 2 or evaporating-chambers, formed of two cup-shaped plates and connected at their outer edges, are arranged one above the other and connected to each other by tubes 3. They are supported by vertical pipes 4. There is a small space between the edges of the pans and the walls of the vessel. Close to the bottom 5 the cylinder-wall has an aperture and a circular steam-supply chamber 6, which, as shown, may be a perforated preferably-flattened pipe fitted in between the bottom 5 and the cylinder and having in its inner wall 7 apertures 8 for the heating steam. From the cylinder-cover 9 leads the pipe 10 for the steam developed from the liquid leading to the preliminary heater. The cylinder is divided by a partition 11 into an upper chamber 12 and a lower chamber 13, and said partition 11 is close to the pipe 3, extending upward from the uppermost pan.

In order that the heating steam should flow right around each pan and come into contact with the bottom 14 and top 15 of each, plates 16 are provided between the pans with upwardly-bent outer edges, which extend to the cylinder-walls, the edges of the pans not doing so, said edges being lower than the centers 17 of said plates 16, through which extend the connecting-pipes 3, and are fixed there. Only at the lowest plate 16 the center is preferably lower. Around the connecting-pipes 3 preferably star-shaped apertures 18 are made in the plates in order not to check too much the passage of steam through the plates. These apertures are provided with raised edges 19, so that the condensed steam descending onto the plates 16 cannot flow to the covers 15 below. When the steam enters the lower part 13 of the cylinder through the inlet-pipe 6, it is cooled and condensed on flowing past the pans by the liquid trickling down inside the pans. The condensed steam accumulates on the plates 16 and flows through the pipes 20 to the bottom 5 and discharge-pipe 21. The pipes 20 of the higher plates 16 are in line with those of the lower plates.

It is obvious that in the various pans the liquid only once flows over surfaces directly heated by steam—namely, after it has flowed off the receiving-plate 22 provided in each pan and flows over the bottom 14 of the pan. The heating of the plates 22 is partly effected by the heat radiated from the covers 15, which are at a very slight distance from said plates 22, but principally by the steam of the liquid flowing over the bottoms 14. In order that the latter steam should not only heat one plate 22, there extends from the center of each plate 22 through the connecting-pipe 3 a pipe 23 to close below the next plate 22 above. By the suction of a steam-jet apparatus (injector) or an air-pump the steam generated on the bottoms 14 is sucked upward through the pipes 23 and passes through apertures 24 in the distributing-plate 25 to the upper cylinder-chamber 12 and through the pipe 10 to the preliminary heater, which is not shown and which it heats. As shown, this steam nowhere comes into direct contact with the liquid. The heating of the entire liquid moving inside the pans therefore takes place both from below and from above and during its vertical flow from pan to pan, from inside and out, so that exceedingly rapid evaporation takes place. The arrangement of the pipes 23 also has the result that during its passage from one pan to the other the developed steam does not repeatedly break through liquid flowing from above and check the flow of the liquid. The height of the pipes 23 prevents the liquid from entering them. The latter has to take the path given by the plates 22 and bottom 14 until it can flow off through the pipe 26 to the receptacles, which are not illustrated. In order to here also prevent its contact with the developed steam led out of the said receptacles by the pipes 27, the latter are connected by means of an inverted T-pipe 28, the upright arm 29 of which extends to close below the plate 22 of the lowest pan and is surrounded by pipe 26, which conducts away the liquid. In order to conduct away the steam generated at those parts where the liquid reaches the bottom 14 from the plates 22, so that the steam does not flow against the liquid between the pipes 3, which might interfere with the heat radiation from the covers 15 and would compel the steam to break through the liquid, pipes 30 are provided near each pan edge on the covers 15, which extend through the plates 16 and the bottoms 14 of the respective pans above to below the somewhat broader lower parts of the next pipe 30. The uppermost pipe 30 passes through the partition 11 and the distributing-plate 25 into the chamber 12 of the vessel. By these pipes the steam generated from the liquid is sucked in the same manner as through the pipes 23.

The liquid after flowing through a preliminary heater (not illustrated) first passes through the pipe 31 into the chamber 12, fills the dish-shaped center part 32 of the distributing-plate 25, and spreads uniformly over the latter. It then trickles from the said plate over the partition 11 to the uppermost pan, and therefore spreads out into very thin layers and moves downward uniformly over a large heated surface, always in the opposite direction to the heating steam.

The receptacles to which the liquid flows are heated by the steam conducted from the chamber 13 of the concentrator through the pipes 33 and the condensed steam conducted through the pipe 21. The steam generated in the said receptacles themselves is drawn off through the pipes 27 and 23.

When the apparatus is to be used for distilling purposes, a separate condenser must be used and connected therewith.

The material of which the apparatus is made depends on the solutions to be evaporated. Instead of a cylindrical chamber one of any other cross-section can of course be used, the pans being shaped accordingly.

Having thus described our invention, we claim as new and desire to secure by Letters Patent of the United States—

1. An apparatus for evaporating liquids, comprising a vessel, a plurality of evaporating-chambers in said vessel, arranged one above the other and each formed of two cup-shaped plates connected at their outer edges, tubes connecting said chambers, means for supplying steam to the exterior of the chambers, means for supplying the liquid to be evaporated to the interior of the chambers, a baffle-plate in each of said chambers, and pipes at the upper part of each of the baffle-plates passing through the connecting-tubes of the chambers, the pipe of one baffle-plate extending upwardly close to the lower end of the pipe of the baffle-plate of the next higher chamber, said pipes forming a conduit for the steam generated from the liquid below the baffle-plates, substantially as set forth.

2. An apparatus for evaporating liquids, comprising a vessel, a plurality of evaporating-chambers in said vessel, arranged one above the other and each formed of two cup-shaped plates connected at their outer edges, tubes connecting said chambers, means for supplying steam to the exterior of the chambers, means for supplying the liquid to be evaporated to the interior of the chambers, a baffle-plate in each of said chambers, pipes at the upper part of the baffle-plates passing through the connecting-tubes of the chambers, the pipe of one baffle-plate extending upwardly close to the lower end of the pipe of the baffle-plate of the next higher chamber, and pipes at the outer part of the upper cup-shaped plates of the chambers passing through the lower cup-shaped plates of the next higher chamber, the upper ends of the pipes of one chamber extending upwardly close to the lower ends of the pipes of the next higher chamber, said pipes forming a conduit for conducting off the steam generated by the liquid above the baffle-plates, and when dropping from the same, substantially as set forth.

3. An apparatus for evaporating liquids, comprising a vessel, a plurality of evaporating-chambers in said vessel, arranged one above the other and each formed of two cup-shaped plates connected at their outer edges, tubes connecting said chambers, means for supplying steam to the exterior of the chambers, means for supplying the liquid to be evaporated to the interior of the chambers, a baffle-plate in each of said chambers, pipes at the upper part of the baffle-plates passing through the connecting-tubes of the chambers, the pipe of one baffle-plate extending upwardly close to the lower end of the pipe of the baffle-plate of the next higher chamber, pipes at the outer part of the upper cup-shaped plates of the chambers passing through the lower cup-shaped plates of the next higher chamber, the upper ends of the pipes of one chamber extending upwardly close to the lower ends of the pipes of the next higher chamber, a transverse partition between each of said evaporating-chambers connected with the connecting-tubes and wall of the vessel, and having openings arranged around said tubes, and pipes for the condensed steam at the lower parts of said partition, substantially as set forth.

4. In an apparatus for evaporating liquids, the combination, with a vessel, a plurality of evaporating-chambers in said vessel, arranged one above the other and each formed of two cup-shaped plates connected at their outer edges, and tubes connecting said chambers, of a plurality of pipes on the upper cup-shaped plates of the chambers, the pipe of one chamber passing through the lower cup-shaped plate of the next higher chamber and extending upwardly close to the lower end of the pipe of that chamber, substantially as set forth.

5. In an apparatus for evaporating liquids, the combination, with a vessel, a plurality of evaporating-chambers in said vessel arranged one above the other and each formed of two cup-shaped plates connected at their outer edges, and tubes connecting said evaporating-chambers, of transverse partitions between each of said evaporating-chambers, connected with the connecting-tubes of the chambers and wall of the vessel, and having openings arranged around said tubes provided with raised edges, and pipes at the lower parts of said partitions, substantially as set forth.

In testimony that we claim the foregoing as our invention we have signed our names in presence of two subscribing witnesses.

HEINRICH DEININGER.
    HERMANN ANDRÉ.

Witnesses:
 WOLDEMAR HAUPT,
 HENRY HASPER.